US011227734B2

(12) United States Patent
Scruggs

(10) Patent No.: US 11,227,734 B2
(45) Date of Patent: Jan. 18, 2022

(54) REMOTE-CONTROLLED SWITCH COVER ASSEMBLY

(71) Applicant: ECOLINK INTELLIGENT TECHNOLOGY, INC., Carlsbad, CA (US)

(72) Inventor: Morgan Scruggs, San Diego, CA (US)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 250 days.

(21) Appl. No.: 16/523,358

(22) Filed: Jul. 26, 2019

(65) Prior Publication Data

US 2019/0348235 A1 Nov. 14, 2019

Related U.S. Application Data

(63) Continuation of application No. 15/395,276, filed on Dec. 30, 2016, now Pat. No. 10,395,865.

(51) Int. Cl.

*H01H 23/16* (2006.01)
*H01H 23/14* (2006.01)
*H01H 9/54* (2006.01)
*H01H 23/04* (2006.01)
*H01H 23/24* (2006.01)

(52) U.S. Cl.

CPC .............. *H01H 23/16* (2013.01); *H01H 9/54* (2013.01); *H01H 23/04* (2013.01); *H01H 23/145* (2013.01); *H01H 23/24* (2013.01); *H01H 2300/03* (2013.01)

(58) Field of Classification Search

CPC ................................ H01H 23/00; H01H 9/00
See application file for complete search history.

(56) References Cited

U.S. PATENT DOCUMENTS

| | | | | |
|---|---|---|---|---|
| 5,458,311 A | | 10/1995 | Holbrook | |
| 8,669,484 B1 | | 3/2014 | Benson | |
| 2004/0074747 A1 | * | 4/2004 | Komatsu | H01H 21/22 200/176 |
| 2005/0016825 A1 | * | 1/2005 | Endres | H02G 3/14 200/339 |
| 2005/0194243 A1 | | 9/2005 | Prineppi | |
| 2015/0228426 A1 | * | 8/2015 | Romano | H01H 3/22 200/331 |
| 2016/0049267 A1 | * | 2/2016 | Bailey | H01H 23/04 307/140 |

OTHER PUBLICATIONS

ISA/US, Int. Search Report and Written Opinion issued on PCT application No. US17/66587, dated Mar. 7, 2018, 11 pages.

* cited by examiner

*Primary Examiner* — Hal Kaplan
*Assistant Examiner* — Joseph N Inge
(74) *Attorney, Agent, or Firm* — Greenberg Traurig, LLP

(57) ABSTRACT

A remote-controlled switch cover assembly is described for converting an existing rocker switch into a remote-controlled switch. The remote-controlled switch cover assembly receives a wireless signal to actuate the existing rocker switch and, in response, activates an electric motor that causes a gear train to turn in a first direction. This causes a wiper to engage an under-surface of a tilt plate located above the existing rocker switch and, in response, an opposing end of the tit plate depresses the existing rocker switch.

18 Claims, 16 Drawing Sheets

114 101 600 600 120 106 110 118 108 112 104 116 100 116 122 102

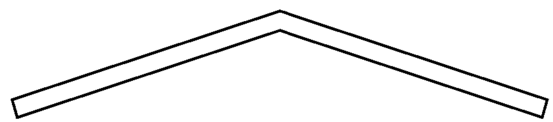
FIG. 5a
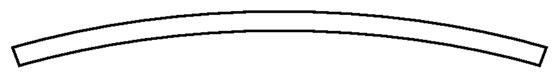
FIG. 5b
FIG. 5c
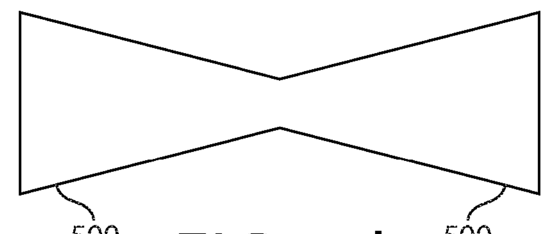
FIG. 5d
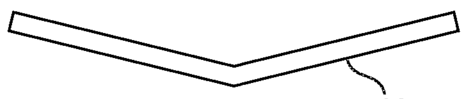
FIG. 5e
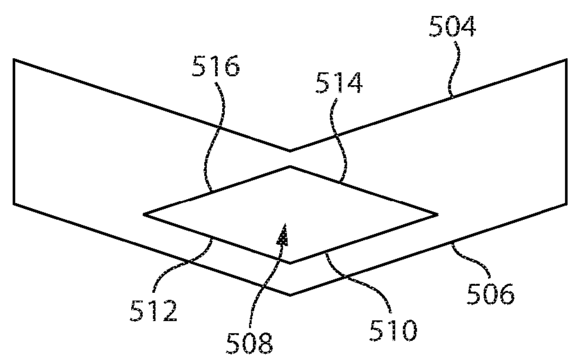
FIG. 5f

REMOTE-CONTROLLED SWITCH COVER ASSEMBLY

CROSS-REFERENCE TO RELATED APPLICATIONS

This application is a continuation of U.S. patent application Ser. No. 15/395,276, filed on Dec. 30, 2016.

BACKGROUND

I. Field of Use

The present application relates generally to the home automation and control arts. More specifically, embodiments of the present invention relate to remote-controlled operation of electrical devices using existing electrical switches.

II. Description of the Related Art

Home automation and control has been gaining popularity in recent years, allowing homeowners to remotely monitor and control various devices in their home. For example, the Nest thermostat has revolutionized the home thermostat market by intelligently learning the usage habits of home occupants, while also allowing remote control of the thermostat via the Internet. Wi-Fi enabled light bulbs are becoming increasingly common, allowing remote control of lights. A variety of other remote control devices are available, including devices that open/close garage doors, turn on/off pool/spa equipment, turn on/off sprinkler systems, etc.

The popularity of being able to control lighting is of particular interest to many consumers. However, it is generally necessary to purchase expensive equipment to enable such a feature, such as expensive Wi-Fi capable light bulbs, or Wi-Fi enabled switches. Such Wi-Fi enabled switches typically require replacement of an entire, existing electrical switch, which many homeowners are incapable, unwilling or afraid to perform.

Recently, at least one design has become available for converting a rocker-type switch into a remote-controlled switch, simply by replacing its light cover plate with one that comprises a receiver for receiving on/off commands, and an actuator to cause the existing rocker switch to activate. Such a design is described in U.S. patent application Ser. No. 14/825,117, assigned to the assignee of the present application. In this design, a wiper is used to contact the surface of the existing rocker switch and rotated over the surface, causing the switch to turn on and off. However, over time, damage may occur to the existing rocker switch as a result of the contact with the wiper, eventually leading to failure of the switch.

It would be desirable, therefore, to design a switch cover device that does not cause damage to an existing rocker switch.

SUMMARY

The present application is directed toward a remote-controlled switch cover assembly for converting an existing, wall mounted rocker switch into a remote-controlled switch. In one embodiment, the remote-controlled switch cover assembly comprises a tilt plate pivotally mounted over the standard rocker switch, comprising a first elongated structure coupled to a second elongated structure joined at an angle to one another, the first elongated structure having a first underside proximate to a first existing rocker switch portion, and the second elongated structure having a second underside proximate to a second existing rocker switch portion, a wiper coupled to a gear train, the gear train coupled to a motor, and the motor for driving the gear train in a first direction to move the wiper in a first wiper direction against the first underside of the tilt plate, wherein the standard rocker switch is turned on when the wiper contacts the first underside, causing an end of the second elongated structure to depress the second rocker switch portion of the standard rocker switch.

In another embodiment, a method is described for operation of a remote-controlled switch cover assembly, comprising receiving a wireless signal to actuate the standard rocker switch, in response to receiving the wireless signal, activating a motor that causes a gear train to turn in a first direction, which in turn causes a wiper to engage an underside of a tilt plate located over the standard rocker switch, and in response to the wiper engaging the underside tilt plate, depressing, by an opposing end of the tit plate, the standard rocker switch.

In another embodiment, a remote-controlled switch cover assembly is described for converting an existing, wall mounted rocker switch into a remote-controlled switch, comprising a manual rocker for allowing manual operation of the existing rocker switch, a tilt plate located between the manual rocker and the existing rocker switch, and a wiper for engaging a first underside portion of the tilt plate that causes rotation of the tilt plate, causing an opposing end of the tilt plate to depress the existing rocker switch.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein:

FIGS. 5*a*-5*f* are side views of various embodiments of a tilt plate as shown in FIGS. 2-4;

FIGS. 8*a*-8*c* are perspective views of the remote-controlled switch cover assembly shown in FIG. 1 with the cover removed, shown with the;

DETAILED DESCRIPTION

Embodiments of the present invention allow a conventional, wall-mounted, rocker-type electrical switch to be converted into a remote-controlled switch simply and economically. In one embodiment, an already-installed, conventional rocker switch is converted into a remote-controlled switch by simply replacing its switch cover with a switch cover assembly in accordance with the teachings herein.

A remote-controlled switch cover assembly may be used to convert a standard, existing rocker switch to one that can be controlled remotely, for example wirelessly using a keyfob or by using a smartphone, tablet, or other personal electronic device via a local gateway device, or via the Internet and a local gateway device, in instances where the controller is located remotely from the rocker switch. In some embodiments, a remote-controlled switch may be controlled via a local security panel or home automation gateway, either alone or in conjunction with the aforementioned wireless devices. In one embodiment, the remote-controlled switch cover assembly is used in conjunction with an existing rocker switch used to supply household AC voltages to electrical devices such as lights, outlets, etc., commonly found in millions of homes and businesses worldwide.

Figure 1:
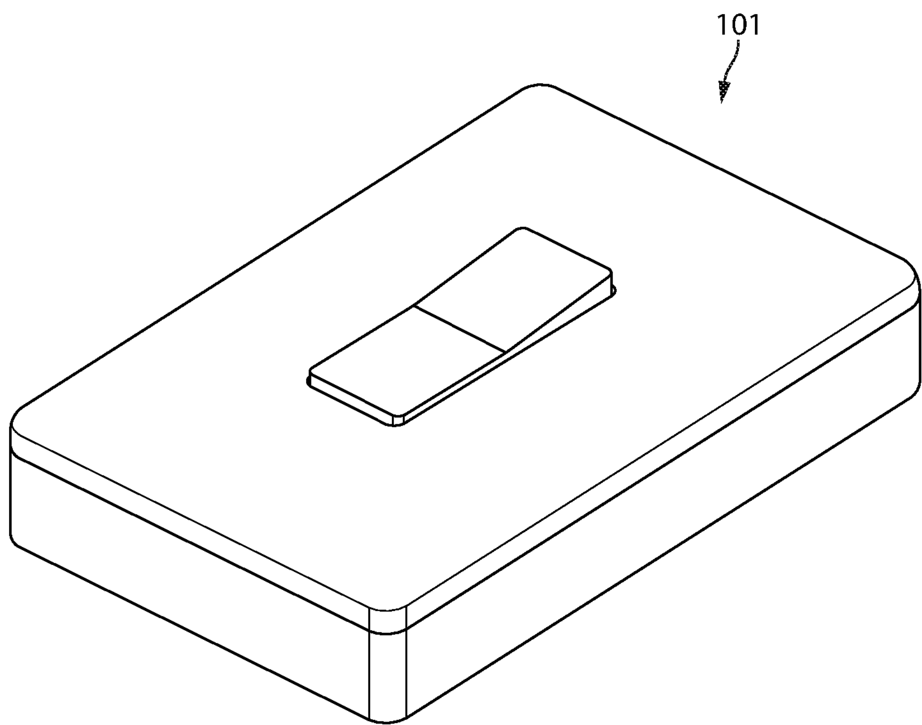
FIG. 1 is a perspective view of one embodiment of a remote-controlled switch cover assembly for use with an existing rocker switch.

FIG. 1 is a perspective view of one embodiment of a remote-controlled switch cover assembly 101, for use with an already-installed, standard rocker switch found in millions of homes and businesses. The remote-controlled switch cover assembly 101 in one embodiment is approximately 28 millimeters thick, 78 millimeters wide, and 120 millimeters long, as shown. It is designed to be placed over an existing rocker switch after its switch cover has been removed. This allows an easy retrofit to convert an existing rocker switch into a remote-controlled rocker switch, while still allowing the existing rocker switch to be operated manually.

Figure 2:
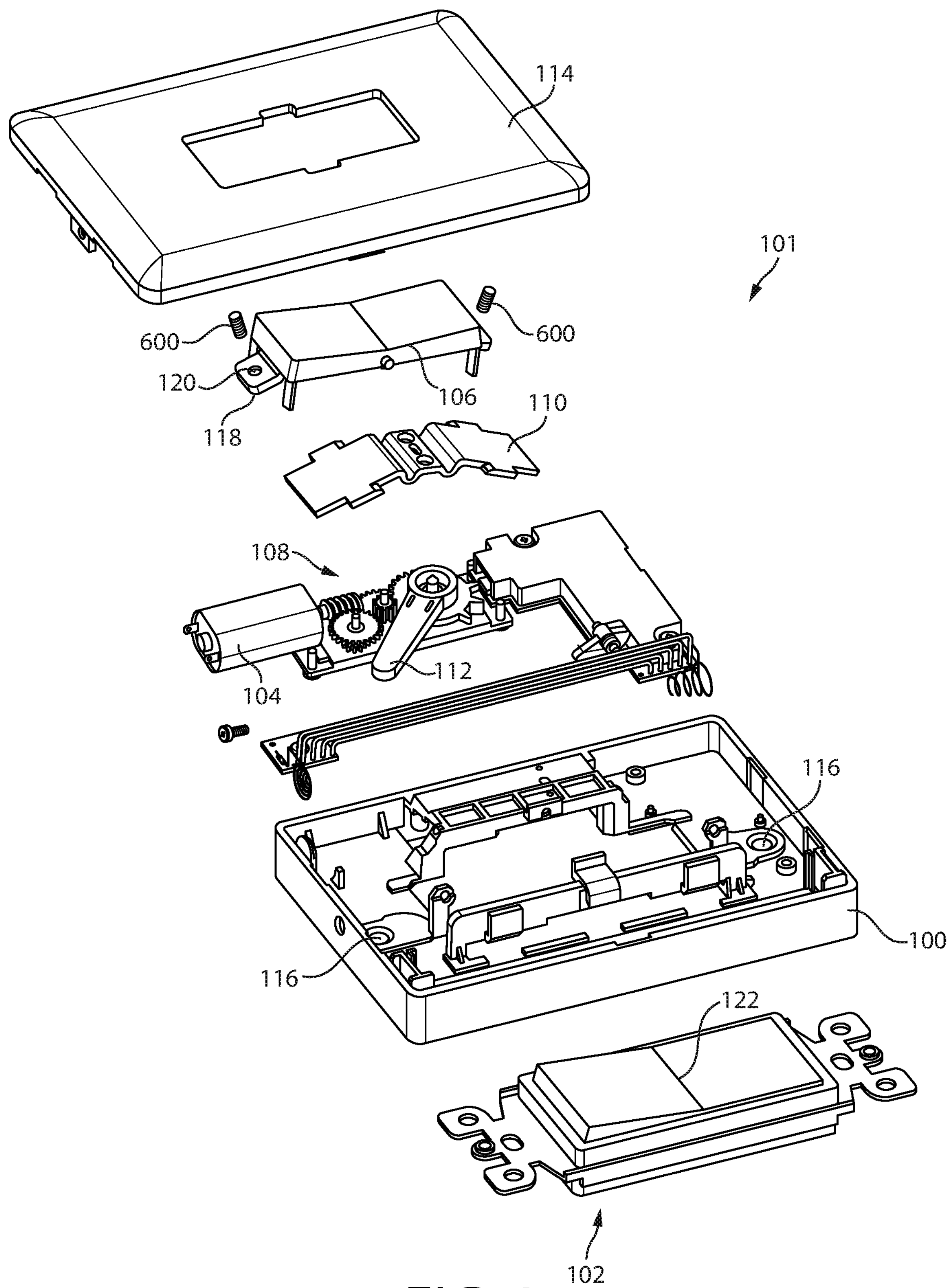
FIG. 2 shows an exploded view of one embodiment of the remote-controlled switch cover assembly of FIG. 1, including the standard rocker switch.

FIG. 2 shows an exploded view of one embodiment of the remote-controlled switch cover assembly 101 of FIG. 1. It comprises housing 100 that is sized and shaped to be installed over existing rocker switch 102, as well as to contain various components of the remote-controlled switch cover assembly 101, such as motor 104, manual rocker 106, gear train 108, tilt plate 110, wiper 112, adjustment posts 600 as well as other components, such as one or more batteries, a receiver or transceiver, and/or other circuitry, that have been omitted for purposes of clarity. In one embodiment, two holes 116 are formed through a bottom surface of housing 100 that align with cover mounting threads of existing rocker switch 102 so that the remote-controlled switch cover assembly 101 can be secured over existing rocker switch 102 using suitably-sized screws. Installation of the remote-controlled switch cover assembly 101 is as easy as removing an existing rocker switch cover, and replacing it with the remote-controlled switch cover assembly 101 shown in FIG. 2.

Figure 3:
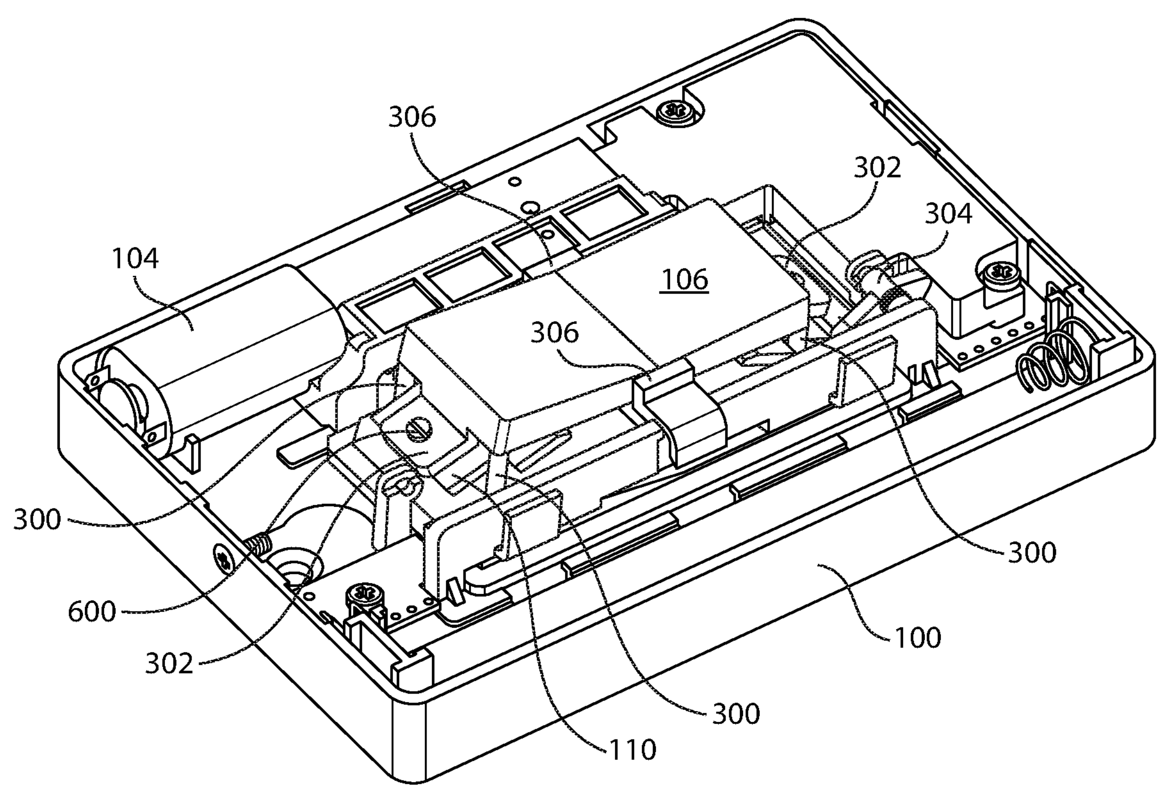
FIG. 3 illustrates a perspective the remote-controlled switch cover assembly of FIG. 1, with the cover removed.

FIG. 3 is a perspective view the remote-controlled switch cover assembly 101 of FIG. 1, with the cover removed, and the components shown in FIG. 2 assembled into housing 100. Also shown is switch state detection mechanism 304, which will be explained in greater detail later below. Manual rocker 106 may be operated by a user to manually manipulate existing rocker switch 102 (hidden from view in FIG. 3). In one embodiment, manual rocker 106 comprises extensions 300 that extend downwards from manual rocker 106 and contact existing rocker switch to move existing rocker switch 102 in conformity with manual rocker 106. In another embodiment, extensions 300 are not present, and existing rocker switch 102 is moved in conformity with manual rocker 106 via tabs 302, one each located on opposing ends of manual rocker 106 that either contact existing rocker switch 102 directly, or indirectly via tilt plate 110. Manual rocker 106 is typically pivotally mounted to support structures 306, which allow manual rocker 106 to pivot about an axis running through support structures 306, i.e., pivoting to mimic operation of existing rocker switch 102. In other embodiments, manual rocker 106 may be pivotally mounted to cover 114.

Figure 4:
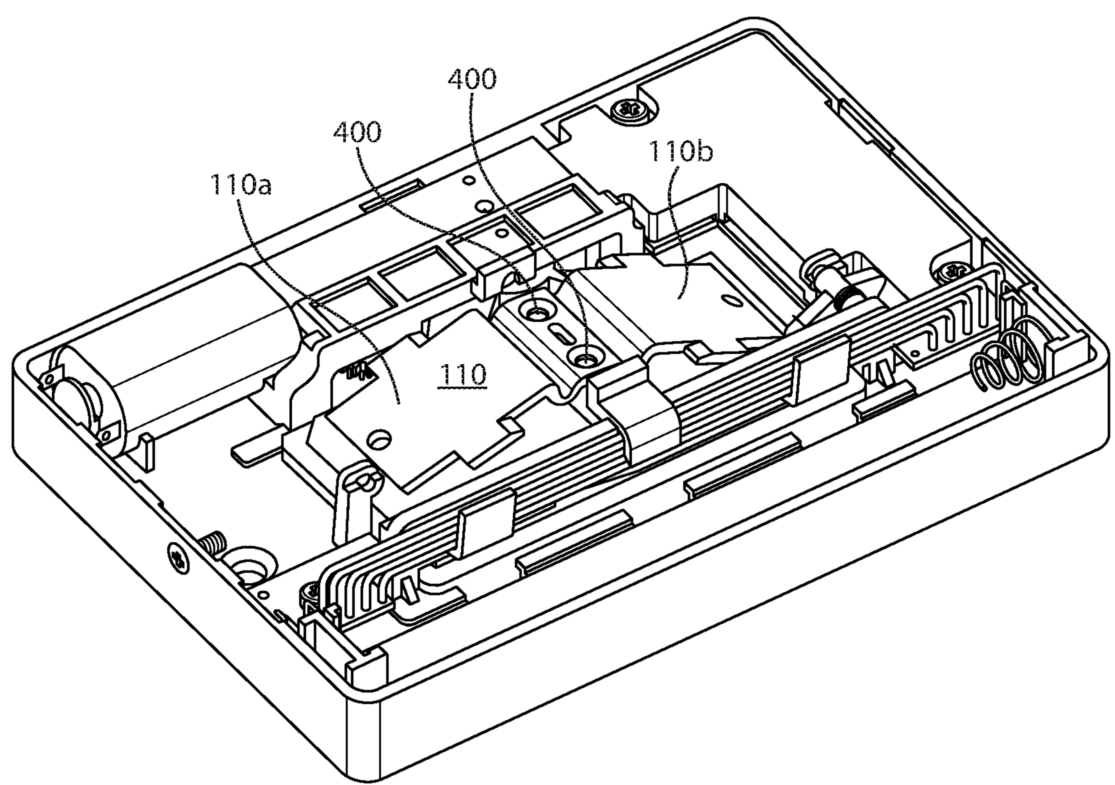
FIG. 4 illustrates a perspective view of the remote-controlled switch cover assembly of FIG. 1, with a manual rocker switch shown in FIGS. 2 and 3 removed.

FIG. 4 illustrates a perspective view of the remote-controlled switch cover assembly 101 of FIG. 1, with manual rocker 106 shown in FIGS. 2 and 3 removed. This view best illustrates tilt plate 110 which, in this embodiment, comprises a unitary, elongated rigid or semi-rigid structure with two strip portions 110*a* and 110*b* that are slightly angled towards one another and located in proximity to existing rocker switch portions 102*a* and 102*b*, respectfully. It should be understood that although tilt plate 110 is shown in FIG. 4 as having a number of distinctive features, such as four tabs extending laterally, three sections (middle and two ends), a "wavy" section joining each of the two ends to a middle section, and two holes, these features are generally optional, depending on the particular implementation and influenced by factors such as manufacturability and cost. For example, in other embodiments, as shown in the side views of FIGS. 5*a*-5*f*, tilt plate 110 may comprise a simple, bent structure (FIG. 5*a*) a curved structure (FIG. 5*b*), a bent structure having a flat middle portion (FIG. 5*c*), or some other shape. In some embodiments, manual rocker 106 and tilt plate 110 may be combined, as shown in FIG. 5*d*, where manual rocker 106 comprises ends 500 that contact existing rocker switch 102. Other shapes may also be contemplated.

FIG. 5*e* shows another embodiment of tilt plate 110, where tilt plate 110 is bent upwards in a direction opposite to the other embodiments shown in FIGS. 5*a*-5*d*. In this embodiment, tilt plate 110 is formed so as to lie over existing rocker switch 102, with bottom surface 502 in close proximity to an upper surface of existing rocker switch 102. In a related embodiment shown in FIG. 5*f*, tilt plate 110 could be incorporated into manual rocker 106. In this embodiment, surface 504 is exposed to users and pressed to toggle manual rocker 106, thereby also toggling existing rocker switch 102 via contact with existing rocker switch 102 via surface 506. A space 508 is formed laterally through manual rocker 106 for insertion of wiper 112. Wiper 112 is then able to toggle existing rocker switch 106 as it comes into contact with surfaces 510 and 512 or surfaces 514 and 516. In other embodiments, space 508 may comprise only a single pair of surfaces (i.e., either surfaces 510 and 512 or 514 and 516. Moreover, space 508 may take other forms other than shown in FIG. 5*f*, such as curved surfaces.

Referring back to FIG. 4, tilt plate 110 attaches to manual rocker 106 via screws (not shown) through holes 400. In other embodiments, tilt plate 110 may be secured to manual rocker 106 via clips, rivets, or some other mechanical means.

Figure 6:
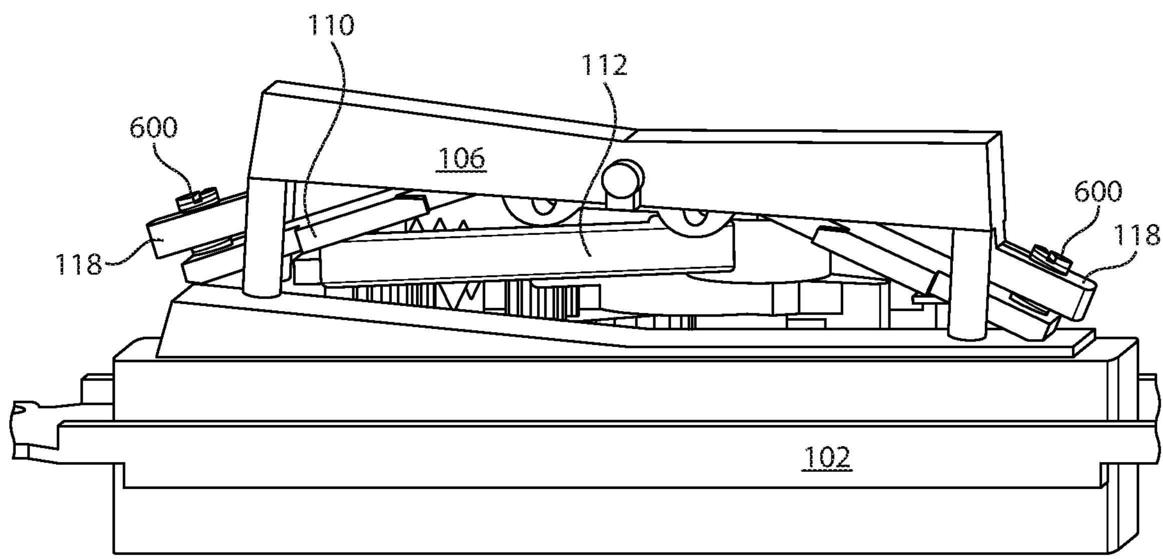
FIG. 6 is a side view of an existing rocker switch, a wiper, a tilt plate and a manual rocker, as shown in FIG. 1, illustrating adjustment posts.

FIG. 6 is a side view of existing rocker switch 102, wiper 112, tilt plate 110 and manual rocker 106, further illustrating adjustment posts 600. The adjustment posts are used to adjust the position of each end of tilt plate 110 with respect to manual rocker 106 and, in turn, existing rocker switch 102. Adjustments may be needed to accommodate for variations in physical attributes among different brands of existing rocker switches. In one embodiment, adjustment posts 600 comprise a small, threaded, cylindrical post that screws into threads formed on holes 120 of tabs 118, respectively. As an adjustment post is screwed in, an opposing end contacts an upper surface of tilt plate 110, pushing one end of tilt plate 110 further away from manual rocker 106. Generally, adjustment of one end of tilt plate 110 does not affect the spatial relationship between manual rocker 106 and the other end of tilt plate 110.

Figure 7:
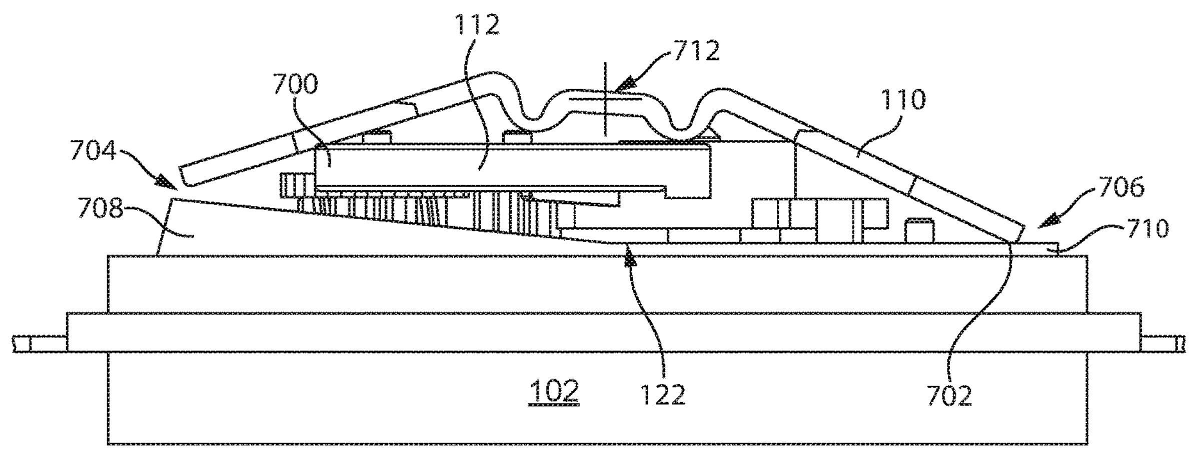
FIG. 7 is a side view of existing an existing rocker switch, wiper, and tilt plate shown in FIG. 2 to illustrate how the wiper toggles the existing rocker switch.

FIG. 7 is a side view of existing rocker switch 102, wiper 112, and tilt plate 110 to illustrate how wiper 112 toggles existing rocker switch 102. When a remote control signal is received by receiver circuitry to remotely operate existing rocker switch 102, wiper 112 is rotated by motor 104 and gear train 108 from a default, center position over valley 122 of existing rocker switch 102, to a position as shown in FIG. 7. Rotation of wiper 112 occurs in relation to an axis 918 of driver gear 920, best shown in FIG. 9. As wiper tip 700 makes contact with tilt plate 110, tilt plate 110 is rotated about axis 712 so that end 704 moves upwards and away from switch end 708, while end 706 moves downwards and towards switch end 710, contacting switch end 710 and moving switch end 710 to the position shown in FIG. 7, causing existing rocker switch 102 to "toggle" from "on" to "off" or from "off" to "on". The axis may be formed by either tilt plate 110 and/or manual rocker 106 by way of the pivot mount to support structures 306, forming a fulcrum. This operation works similarly to move wiper 112 in an opposite direction, toward end 706, causing existing rocker switch 102 to move to an opposite position as that shown in FIG. 7.

Figure 8A:
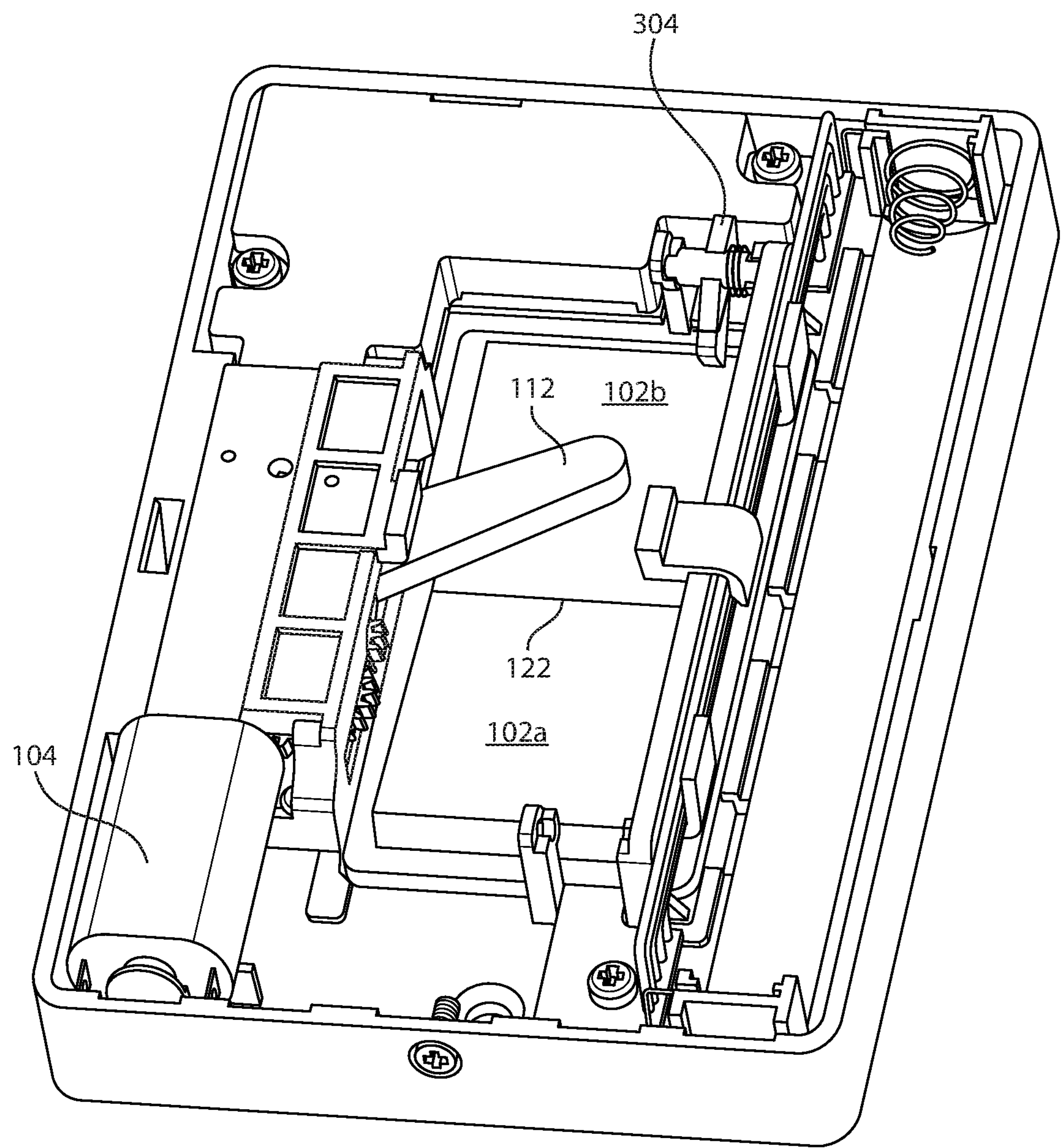
Figure 8B:
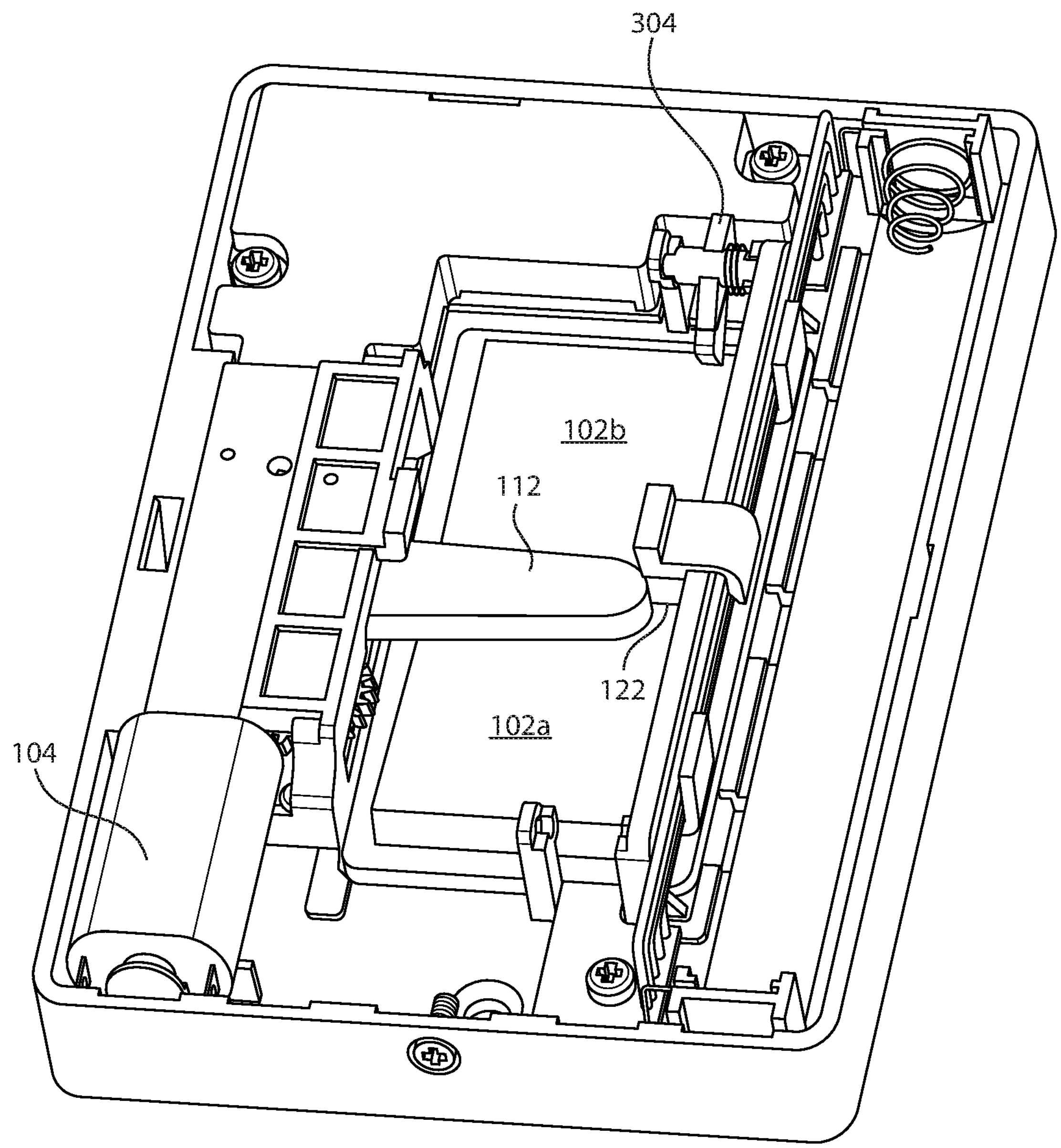
Figure 8C:
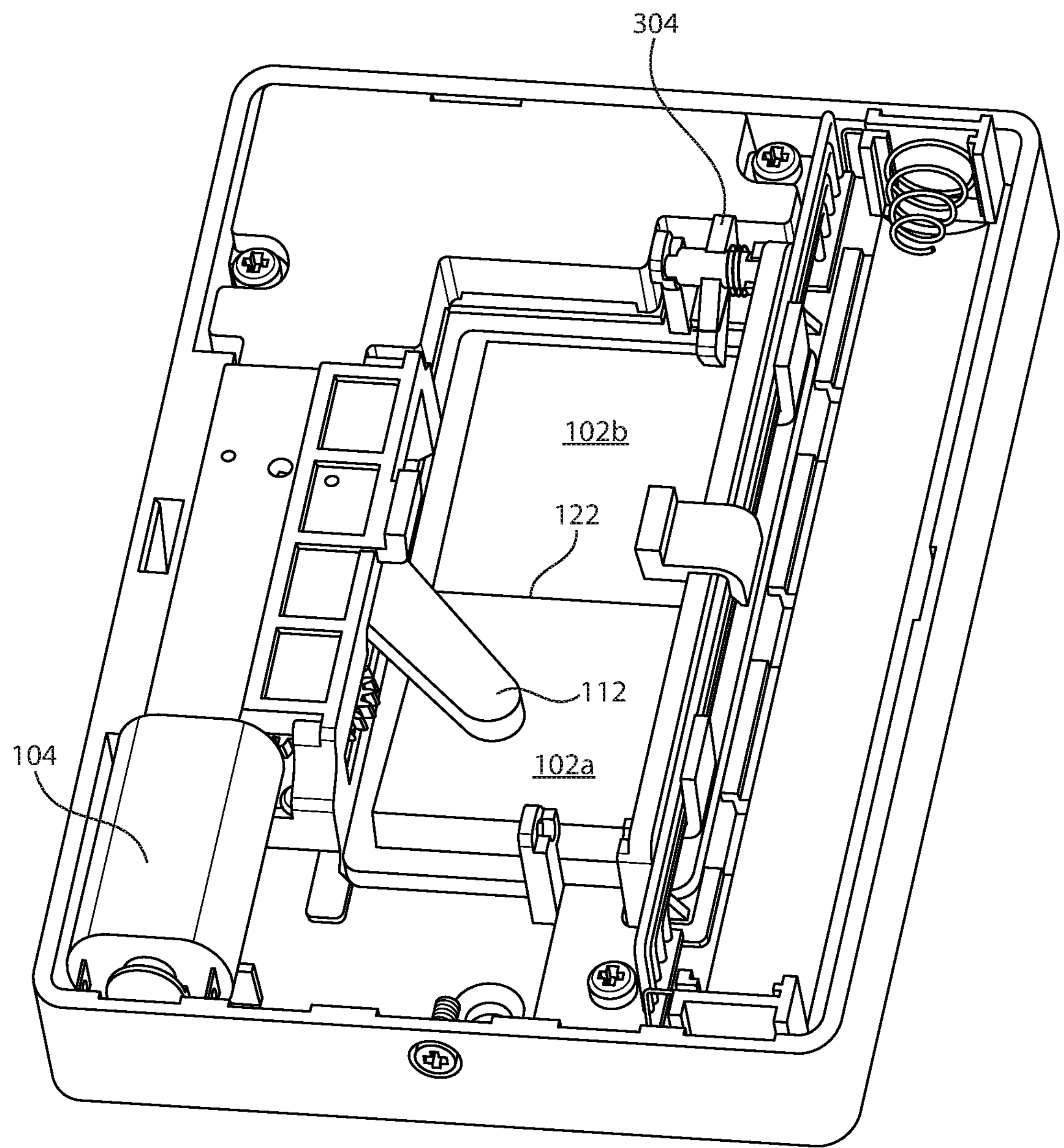

After wiper 112 has caused existing rocker switch 102 to toggle, wiper 112 is moved back to the default position over valley 122 of existing rocker switch 102. This allows manual manipulation of existing rocker switch 102 by a user, as existing rocker switch 102 and manual rocker 106 are free to operate without interference from wiper 112. FIGS. 8*a*-8*c* illustrate this concept. Each of these figures show the remote-controlled switch cover assembly 101 from a top, perspective view without cover 114, manual rocker 106 or tilt plate 110 so that the position of wiper 112 may be seen. In FIG. 8*a*, wiper 112 is shown rotated to a first maximum position, in response to receiving a wireless command from receiver circuitry (as will be explained later herein), turning existing rocker switch 106 either "on" or "off" via tilt plate 110. For purposes of discussion, the position shown in FIG. 8*a* is assumed to have turned existing rocker switch 102 "off". It should be noted that in this position, existing rocker switch portion 102*b* is in a raised position, while portion 102*a* is pressed downwards from the force applied by tilt plate 110 in reaction to wiper 112 contacting the tilt plate.

After wiper 112 has reached the first maximum position (as determined by switch state detection mechanism 304, as explained later herein), wiper 112 is rotated in an opposite direction, to the default position over valley 122 as shown in FIG. 8*b*.

FIG. 8*c* illustrates wiper 112 rotated to a second maximum position, toggling existing rocker switch "on" as tilt plate 110 pushes portion 102*b* downwards to a lowered position, causing portion 102*a* to move upwards. Wiper 112 moves from the default position to the second maximum position as a result of receiving a remote control signal via the receiver circuitry. After achieving the second maximum position, wiper 112 is returned to the default position over valley 122.

It should be noted that at no time does wiper 112 come in contact with existing rocker switch 102, including portions 102*a* or 102*b*. Existing rocker switch 102 is operated as wiper 112 contacts tilt plate 110, which in turn causes operation of existing rocker switch 102.

Figure 9:
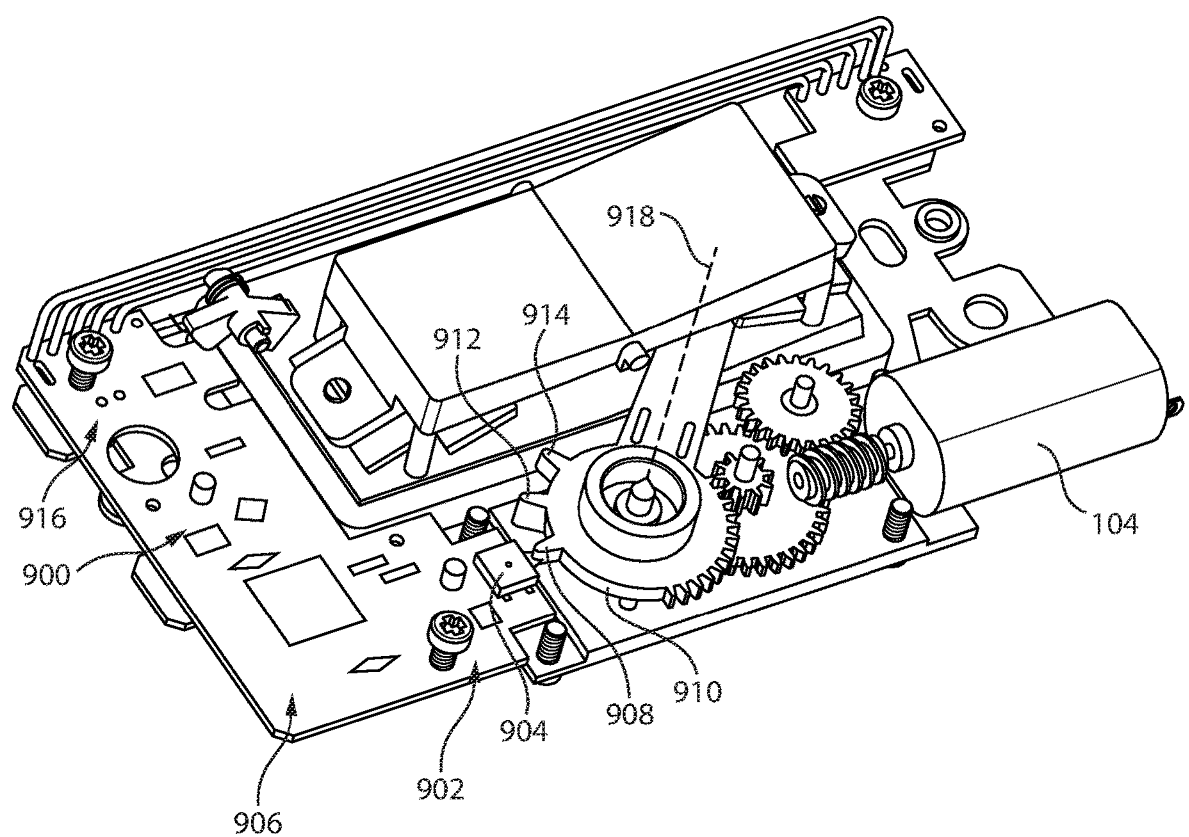
FIG. 9 is a side view of the switch state detection mechanism.

Remote operation of the remote-controlled switch cover assembly 101 occurs when a user wishes to remotely toggle existing rocker switch 102 to turn lights on or off for example, using a device which sends wireless signals to receiver circuitry 900 located within the remote-controlled switch cover assembly 101, as shown in FIG. 9. FIG. 9 is a perspective view of the remote-controlled switch cover assembly 101 with housing 100 and cover 114 removed. Receiver circuitry 900 receives wireless or wired signals from the device, either directly or indirectly (i.e., via a home automation gateway, security panel, etc.) and provides them to processing circuitry 906, which in turn provides signals to motor driving circuitry 902 that powers motor 104 to turn wiper 112 in order to manipulate existing rocker switch 102 to the "on" or "off" state. For example, when a command is received from a remote device instructing the remote-controlled switch cover assembly 101 to turn lights on, receiver circuitry 900 receives the wireless signal from the device or intermediary device and provides a down-converted baseband signal to processing circuitry 906 such as one or more transistors, capacitors, resistors, processors, etc. Processing circuitry 906 then provides a signal to motor 104, typically a low-power DC motor, which causes it to rotate in one direction, which in turn causes gear train 108 to turn in one direction, which in turn causes wiper 112 to move in one direction from the default position.

In one embodiment, when wiper 112 reaches the first maximum position (as shown in FIG. 8*a* and in FIG. 9), a deformation 908 located on a perimeter 910 of wiper 112 comes in contact with switch 904, as shown in FIG. 9. In this embodiment, perimeter 910 comprises three such deformations, comprising three "humps" or a "bumps" or other protrusions on perimeter 910, although in other embodiments they could comprise recesses, holes or other negative impressions in perimeter 910. In response to deformation 908 coming into contact with switch 904, processing circuitry 906, which is coupled to switch 904, provides a signal to motor driving circuitry 902 to reverse the direction of the motor, causing wiper 112 to reverse direction back towards the default position over valley 122. Other techniques may be used to determine when wiper 112 has reached the first and second maximum positions, such as processing circuitry 906 measuring the current drawn by motor 104 (i.e., a sudden spike in current draw means that wiper 112 has reached a hard, physical stop at the first or second maximum positions) or by having processing circuitry 906 measure the current through existing rocker switch 102.

The deformations and switch 904 may alternatively or additionally be used to detect when wiper 112 has reached the second maximum position via deformation 914 or when wiper 112 has been moved back over valley 122, after reaching either the first or second maximum positions, via deformation 912. Alternatively, other sensing techniques may be used to determine when wiper 112 is in the default position, such as by processing circuitry 906 determining a number of revolutions of motor 104 and/or any of the gears comprising gear train 108 as the wiper is moved to either the "on" position or "off" position, then rotating motor 104/gear train 108 an equal amount in the opposite direction. In the present embodiment, when wiper 112 reaches the default position, deformation 912 contacts switch 904, causing processing circuitry to halt motor 104.

Figure 10:
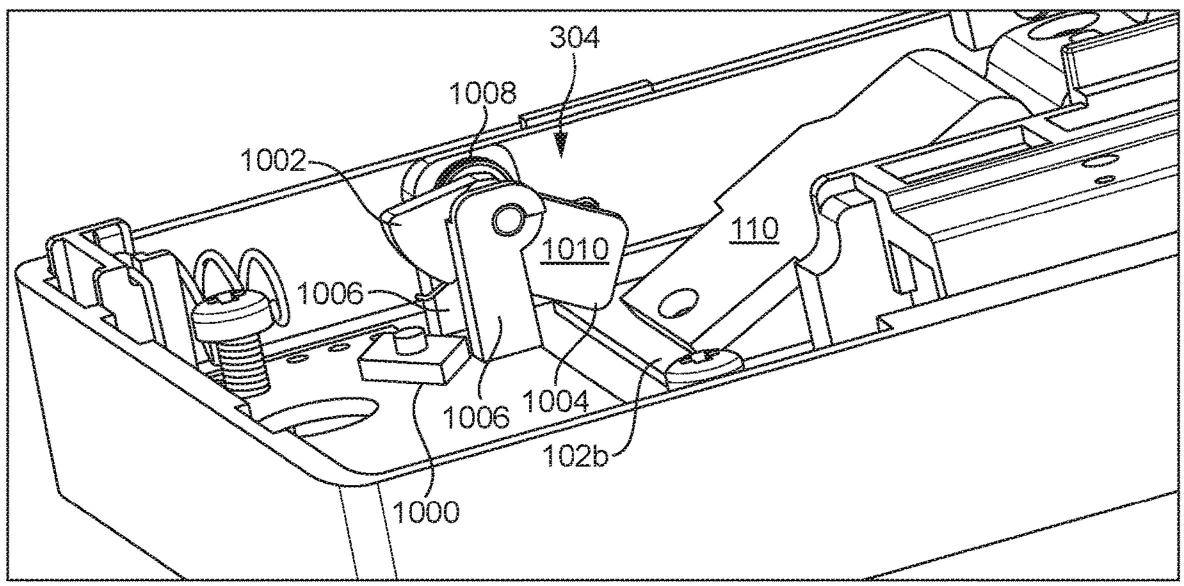
FIG. 10 is a perspective, close-up view of a portion of the remote-controlled switch cover assembly of FIG. 1, with the cover removed, illustrating a switch state detection mechanism.
Figure 11:
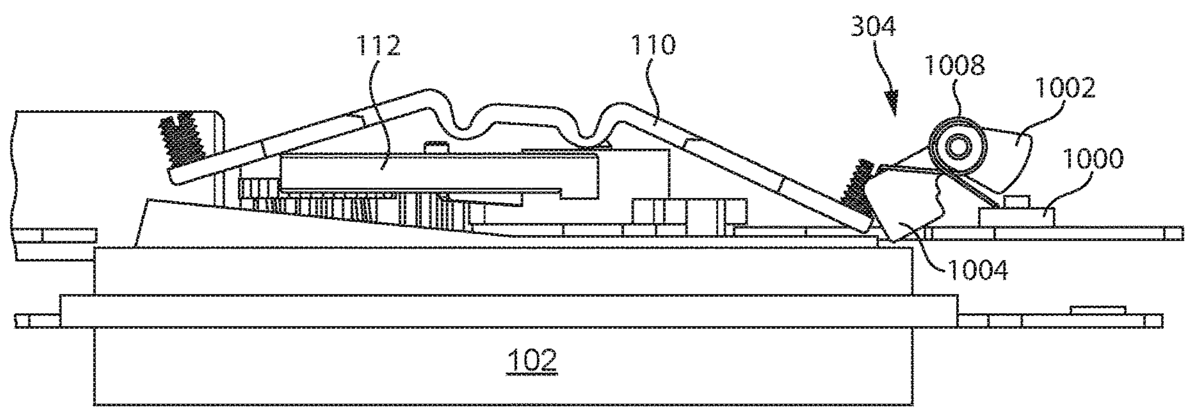
FIG. 11 is a side view of the remote-controlled switch cover assembly 101 shown in FIG. 1 with the cover and housing 100 removed, also illustrating the switch state detection mechanism as shown in FIG. 10.

FIG. 10 is a perspective, close-up view of a portion of the remote-controlled switch cover assembly 101 with cover 114 removed, illustrating switch state detection mechanism 304. FIG. 11 is a side view of the remote-controlled switch cover assembly 101 with cover 114 and housing 100 removed, also illustrating switch state detection mechanism 304. In this embodiment, switch state detection mechanism 304 is used to convey an actual switch position of existing rocker switch 102 to processing circuitry 906 (not shown), so that an actual position of existing rocker switch 102 may be known. In this embodiment, switch state detection mechanism 304 comprises lever 1010 pivotally mounted on a pair of posts 1006. One end 1004 of lever 1010 is positioned over existing rocker switch portion **102*b* so that when existing rocker switch 102 is placed into a first position, such as "on" (as shown in FIG. 10), portion 102*b* is pushed downward and end 1004 of lever 1010 is forced downward against portion 102*b* by spring 1008. Existing rocker switch 102 may be switched to the on position either manually, by a user operating manual rocker 106, or remotely via receiver circuitry 900, processing circuitry 906, motor driving circuitry 902 motor 104, gear train 108 and wiper 112 acting against tilt plate 110. In this position, pushbutton switch 1000 is not depressed, causing an open circuit (or, alternatively, a closed circuit in a normally closed switch) that is detected by processing circuitry 906, indicating that existing rocker switch 102 is in the "on" position. Processing circuitry 906 may, in turn, cause a signal to be transmitted to a remote device, indicating that existing switch 102** is on.

Figure 12:
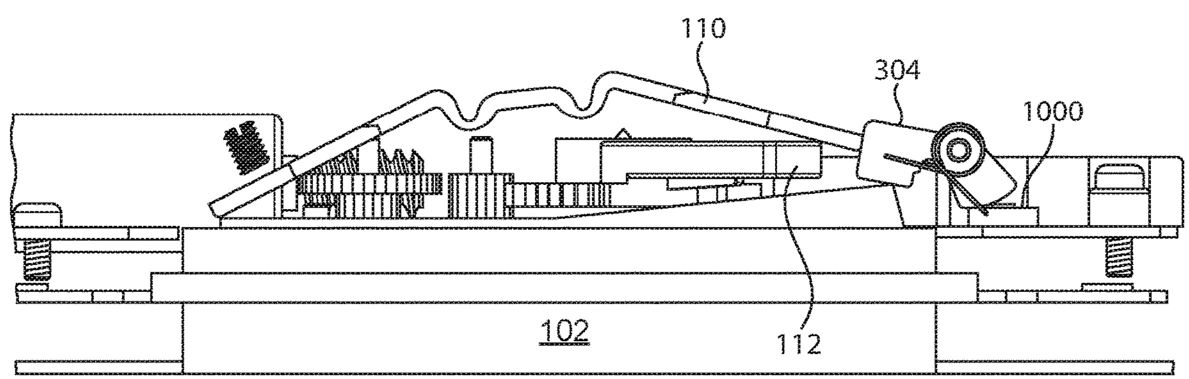
FIG. 12 is a side view of the remote-controlled switch cover assembly 101 as shown in FIG. 1, with the cover and housing removed, illustrating the existing rocker switch as shown in FIG. 1 in the off position.

FIG. 12 is a side view of the remote-controlled switch cover assembly 101 with cover 114 and housing 100 removed, illustrating existing rocker switch 102 in the off position. Again, existing rocker switch 102 may have been placed into the off position either manually or remotely. In this position, existing rocker switch 102 is placed into a second, "off" position, i.e., portion **102*b* is forced upward, and end 1002 of lever 1010 is forced downward against switch 1000, depressing pushbutton switch 1000. This causes a closed circuit in pushbutton switch 1000 (or, alternatively, an open circuit in a normally closed switch) that is detected by processing circuitry 906, indicating that existing rocker switch 102 is in the "off" position. Processing circuitry 906 may, in turn, cause a signal to be transmitted to a remote device, indicating that existing switch 102** is off.

In one embodiment, both switch 904 and switch 1000 are used to determine when wiper 112 has reached either the first or the second maximum position, or the default, valley position. Use of both switches may help processing circuitry 906 may know the position of wiper 112 when remote-controlled switch cover assembly is first turned on, or after a sudden loss of power, for example. In this embodiment, processing circuitry 906 determines that wiper 112 is at one of the maximum positions when processing circuitry 906 detects activation of both switch 904 and switch state detection mechanism 304. For example, processing circuitry may determine that wiper 112 is at the first maximum position when switch 904 is depressed by one of protrusions on perimeter 910 and switch 1000 is also depressed. At that time, processing circuitry 906 causes motor 104 to reverse direction, causing switch 904 to become depressed, until switch 904 is depressed once more by protrusion 912 (switch 1000 remains depressed).

Figure 13:
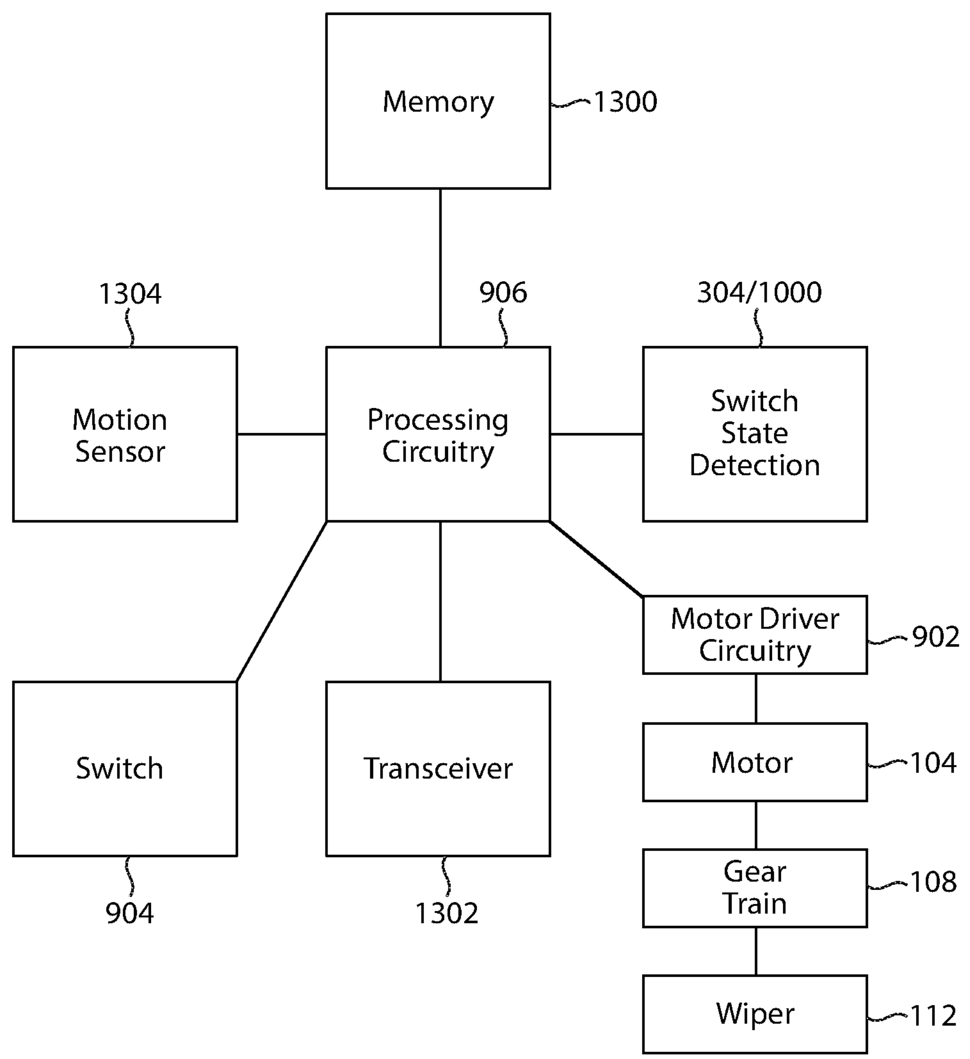
FIG. 13 is a functional block diagram of one embodiment of the remote-controlled switch cover assembly as shown in FIG. 1.

FIG. 13 is a functional block diagram of one embodiment of the remote-controlled switch cover assembly 101 shown in FIG. 1, comprising processing circuitry 906, memory 1300, transceiver 1302, motor 104, gear train 108, wiper 112, switch state detection mechanism 304, optional motion sensor 1304, switch 904 and motor driving circuitry 902. It should be understood that in some embodiments, not all of the functional blocks shown in FIG. 13 are necessary for the proper operation of the remote-controlled switch cover assembly 101 and that some functionality has been omitted for purposes of clarity.

Processing circuitry 906 comprises one or more general-purpose microprocessors, microcontrollers and/or custom or semi-custom ASICs, and/or discrete components able to carry out the functionality required for operation of the remote-controlled switch cover assembly 101. Processing circuitry 906 is selected based on processing capabilities, power-consumption properties, cost and space considerations, as the remote-controlled switch cover assembly 101 typically operates on batteries and a small form factor is desirable. In the case of a microprocessor, microcontroller, or ASIC, processing circuitry 906 generally executes processor-executable instructions stored in one or more memories 1300 that control the functionality of the remote-controlled switch cover assembly 101. Examples of the memory include one or more electronic memories such as RAM, ROM, hard drives, flash memory, EEPROMs, UVPROMs, etc. or virtually any other type of electronic, optical, or mechanical memory device, but excludes propagated signals. Memory 1300 could alternatively comprise an integrated circuit, such as a flip-flop, or even discrete components, such as one or more transistors, resistors, capacitors, etc.

Transceiver 1302 comprises circuitry necessary to transmit and receive communication signals, including messages, commands, status information, requests, etc., between the remote-controlled switch cover assembly 101 and a remote device, either directly or through a local device such as a gateway, security panel, or home automation panel. Such circuitry is well known in the art and may comprise BlueTooth, Wi-Fi, RF, optical, or ultrasonic circuitry, among others. In other embodiments, transceiver 1302 comprises discreet circuitry for transmitting information and separate circuitry for receiving information. The type of information that may be transmitted may comprise the state of existing rocker switch 102 (e.g., "on" or "off", toggled), battery status (e.g., warning signal sent when battery is low), supervisory signal to indicate the presence and operational confirmation of the remote-controlled switch cover assembly 101, a signal indicative of whether a command to remotely operate existing rocker switch 102 was successful or not, and/or a signal indicative of detected movement, e.g., by a motion sensor optionally integrated into the remote-controlled switch cover assembly 101. Processing circuitry 906 may, in some embodiments, provide one or more types of information periodically, such as once per hour, or upon receipt of a command from a remote device to provide one or more types of information, or upon detection of a change in state of existing rocker switch 102.

Optional motion sensor 1304 comprises any device that is able to detect movement of a person within range of the remote-controlled switch cover assembly 101. In one embodiment, a passive infrared sensor detector is used, although other types of motion sensors may be used in the alternative, keeping the low power requirement of the remote-controlled switch cover assembly 101 in mind. In other embodiments, motion sensor may comprise a light-beam interruption detector, a sonic transducer, or a reed switch.

When used in conjunction with optional motion sensor 1304, the remote-controlled switch cover assembly 101 may automatically turns lights on or off when people enter or leave a room. When the motion sensor detects movement, indicative of activity in a room, the motion sensor may provide a signal to processing circuitry 906, indicative of such. In response, processing circuitry 906 may cause electronic motor to rotate in order to place existing rocker switch 102 into an "on" position. Similarly, if the motion sensor does not detect movement in the room for more than a predetermined time period, such as 10 minutes, processing circuitry 906 may cause the electric motor to rotate to turn the existing rocker switch to an "off" position. When existing rocker switch 102 is turned on or off, a signal may be transmitted to a remote location, alerting a user of the change in state of existing rocker switch 102.

In a related embodiment, the remote-controlled switch cover assembly 101 may turn existing rocker switch 102 on or off as a result of receiving a signal from a remote device, indicative of when activity is detected in a room. For example, a stand-alone motion sensor could sense motion in a room, and then report that finding to a home security panel. The home security panel might then transmit a command to the remote-controlled switch cover assembly 101 to turn the existing rocker switch to the "on" position. In one embodiment, the stand-alone motion sensor is located in one room (such as a foyer) and the remote-controlled switch cover assembly 101 located in another room, such as a living room, so that when the motion sensor detects movement, the home security panel can send a signal to the remote-controlled switch cover assembly 101 in the living room, so that the living room is lit, for example, when a person enters his/her home.

In another embodiment, a remote-controlled switch cover assembly 101 could be used in conjunction with a typical, manually operated switch, such as in an application where hallway lighting is controlled by two switches, one located at each end of the hallway. This may be referred to by those skilled in the art as a "three-way circuit". In this embodiment, the remote-controlled switch cover assembly 101 could transmit a status signal to a remote device such as a home security panel, home automation system, or internet gateway, with a light status of whether the hall light is "on" or "off". Such a determination may be made using a current-sensing device, such as a coil, integrated circuit, and/or other circuitry to sense current flowing through existing rocker switch 102, in combination with switch state detection mechanism 304. In one embodiment, an on/off status signal is transmitted to a remote device upon detection of a change of state, i.e., a change of the light illumination from "on" to "off" or vice-versa. The state change may be detected by storing the last known mechanical position of the standard rocker switch 102 as presented by switch state detection mechanism 304. A storage device, such as memory 1300, flip-flop, or discrete circuitry can be used to store the state of the external rocker switch 102, e.g., either "on" or "off". The same storage device, or a different one, may store an indication of whether current is flowing through existing rocker switch 102 using the current sensor. Thus, at any time, the remote-controlled switch cover assembly 101 knows which position the external rocker switch 102 is in and whether the current is flowing or not. Then, if a command is received via transceiver 1302 to either turn the light on or off from a remote device, processing circuitry 906 can determine whether the wiper 112 must be activated and, if so, what direction to wipe, depending on whether the command is to turn the light on or off. For example, in a three-way application that uses a regular switch and a remote-controlled switch cover assembly 101, if the remote-controlled switch cover assemblies is in an "on" position, i.e., in this example, portion 102*b* of existing rocker switch 102 is pushed towards housing 100, and the current sensor determines that current is flowing through existing rocker switch 102, an indication is stored in memory 1300, indicating that the existing rocker switch 102 is in the "on" position and that current is flowing through existing rocker switch 102. Thereafter, if external rocker switch is manually manipulated via manual rocker 106, turning the light off, the current sensor detects the loss of current, and processing circuitry 906 stores the current status of existing rocker switch as being "off" in the memory. Then, if a command is received by the remote-controlled switch cover assembly 101 to turn the light on, processing circuitry 906 will determine the present light status and know that the light is off, and that the existing rocker switch is in the "up" position. Knowing this, processing circuitry 906 provides a signal to the electric motor 104 to turn the motor shaft in a way that will turn wiper 112 in a direction to place the existing rocker switch 102 into an opposite state, in this example, in the "down" state.

Switch state detection mechanism 304 comprises, in one embodiment, the mechanism shown in FIGS. 10-12. In another embodiment, switch state detection mechanism 304 may comprises a device to detect the presence of alternating current that is conducted through existing rocker switch 102. Typically, a current sensor comprises a coil, integrated circuit, and/or discrete components to wirelessly determine changes in flux occurring as a result of a change in current through existing rocker switch 102. The current sensor provides a signal indicative of the current to the processing circuitry 906, and processing circuitry stores a status of the current in memory 1300.

Motor driving circuitry 902 is coupled to processing circuitry 906 and provides one or more relatively high power signals to motor 104 that causes motor 104 to rotate in one direction or the other. Such circuitry is well-known in the art.

Figure 14:
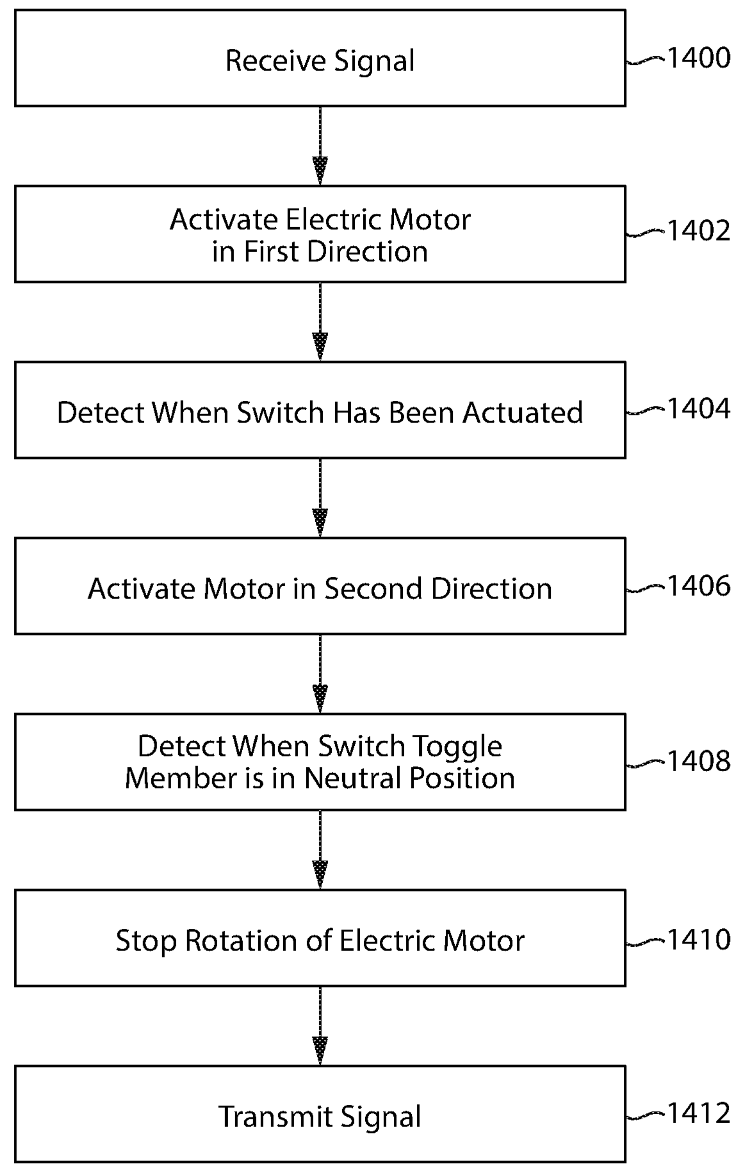
FIG. 14 is a flow diagram of one embodiment of a method for remote control of an existing rocker switch performed by a remote-controlled switch cover assembly.

FIG. 14 is a flow diagram of one embodiment of a method for remote control of an existing rocker switch performed by a remote-controlled switch cover assembly 101 in accordance with the teachings herein. It should be understood that the steps described in this method could be performed in an order other than what is shown and discussed and that some minor method steps may have been omitted for clarity and simplicity.

At block 1400, transceiver 1302 (or a wireless receiver in an embodiment where a transmitter is not used) receives a wireless signal to actuate existing rocker switch 102, to turn lights on or off, for example. The wireless signal may originate from a smart phone, mobile computer, fixed computer, home automation gateway, security system, or some other device known in the art.

At block 1402, in response to receiving the wireless signal, processing circuitry 906 activates motor 104 that causes gear train 108 to turn in a first direction, commensurate with turning the standard rocker switch to a position indicated by the wireless signal, i.e., "off", "on", "toggle", etc. In practice, processing circuitry 906 provides a signal to motor driving circuitry 902 which in turn provides a power signal to motor 104. This, in turn, causes wiper 112 to rotate until it contacts tilt plate 110, causing an opposite end of tilt plate 110 to push down on a portion of existing rocker switch 102, causing existing rocker switch 102 to change state.

At block 1404, processing circuitry 906 detects when wiper 112 has actuated the standard rocker switch, i.e., when the standard rocker switch has been placed in either the "on" or "off" position. This detection is performed in accordance with the teachings previously discussed above.

At block 1406, in response to detecting when the wiper has actuated the existing rocker switch 102, processing circuitry 906 causes motor 104 to rotate in a reverse direction (again, by providing a signal to motor driving circuitry 902) from the first direction, which causes wiper 112 to move back towards valley 122 of existing rocker switch 102.

At block 1408, processing circuitry 906 detects when wiper 112 is positioned over valley 122 of existing rocker switch 102. This detection is performed in accordance with the teachings previously discussed above.

At block 1410, in response to detecting when wiper 112 is positioned over valley 122, processing circuitry 906 causes motor 104 to stop rotating (by sending a signal to motor driving circuitry 902), causing wiper 112 to remain positioned over valley 112.

At block 1412, processing circuitry 906 may cause a signal to be transmitted via transceiver 1302 to a remote location, such as a security panel, home automation gateway, smart phone, mobile computing device, etc., indicating the position of the standard rocker switch.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A remote-controlled switch cover assembly for converting an existing rocker switch into a remote-controlled switch, comprising:

a tilt plate having first and second end portions for contacting a first existing rocker switch surface and a second existing rocker switch surface, respectively;

a motor;

a gear train coupled to the motor; and a wiper coupled to the gear train;

wherein the motor is for driving the gear train in a first rotational direction to move the wiper against the first end portion of the tilt plate, causing the first end portion to move in a first direction and the second end of the tilt plate to move in an opposite, second direction against the second rocker switch surface.

2. The remote-controlled switch cover assembly of claim 1, further comprising:

motor driving circuitry for driving the motor; a wireless receiver for receiving wireless signals that cause activation of the motor; and processing circuitry coupled to the wireless receiver and the motor driving circuitry that causes the processing circuitry to actuate the motor in accordance with the wireless signals received by the receiver.

3. The remote-controlled switch cover assembly of claim 1, wherein the gear train comprises a driver gear, and the wiper comprises a tip, wherein the wiper is coupled to the driver gear with the tip extending away from the driver gear, and rotation of the driver gear causes the tip of the wiper to contact an undersurface of the first end portion, causing the second end portion to contact the second rocker switch surface or to contact an undersurface of the second end portion, causing the first end portion to contact the first rocker switch surface.

4. The remote-controlled switch cover assembly of claim 1, wherein the driver gear comprises an outer, toothed circumference and a collar, wherein the wiper is coupled to the collar.

5. The remote-controlled switch cover assembly of claim 1, wherein the remote-controlled switch cover assembly further comprises: a housing for containing the tilt plate, the wiper, the motor, and the gear train; a hole formed through the housing for alignment with threaded cover mounting holes of the existing rocker switch; and a fastening device sized and shaped for placement through the hole, and for engaging the threaded mounting hole, to secure the remote-controlled switch cover assembly to the existing rocker switch.

6. The remote-controlled switch cover assembly of claim 1, further comprising: a manual rocker mounted over the tilt plate for allowing manual control of the existing rocker switch, comprising a first downward extension located at a first end of the manual rocker and a second downward extension located at a second end of the manual rocker, for engaging the first rocker switch surface and the second rocker switch surface, respectively, as the manual rocker is operated manually by a user.

7. The remote-controlled switch cover assembly of claim 6, further comprising: a tab extending from a first end of the manual rocker, the tab comprising a threaded hole; and a threaded adjustment post screwed into the threaded hole and extending towards the tilt plate; wherein a relative position of the manual rocker to the tilt plate is adjusted by rotation of the adjustment post in the threaded hole.

8. The remote-controlled switch cover assembly of claim 1, further comprising: a first switch for determining when the wiper is positioned substantially over a valley of the existing rocker switch; wherein the motor stops driving the gear train when the wiper is positioned substantially over the valley of the existing rocker switch.

9. The remote-controlled switch cover assembly of claim 8, wherein the wiper comprises a driver gear having a partial toothed perimeter for engaging the gear train, and having a deformity that activates the switch when the wiper is moved over the valley of the existing rocker switch.

10. The remote-controlled switch cover assembly of claim 8, wherein the gear train comprises a driver gear having a collar, the collar having a deformity on a surface of the collar that activates the contact switch when the wiper is moved over the valley of the existing rocker switch.

11. The remote-controlled switch cover assembly of claim 1, wherein the gear train comprises a driver gear and the remote-controlled switch cover assembly further comprises: a contact switch for determining when the wiper is positioned substantially over a valley of the existing rocker switch; and three deformations located on a circumference of the driver gear, a first deformation for engaging the contact switch when the wiper is positioned substantially over the valley of the existing rocker switch, the second deformation for engaging the contact switch when the existing rocker switch has been placed into an on position and the third deformation for engaging the contact switch when the existing rocker switch has been placed into an off position.

12. The remote-controlled switch cover assembly of claim 1, further comprising: a transmitter for transmitting a signal indicative of a state of the existing rocker switch.

13. The remote-controlled switch cover assembly of claim 1, further comprising: a transceiver for receiving a wireless signal to toggle the existing rocker switch; processing circuitry coupled to the transceiver for operating the motor as a result of receiving the wireless signal from the transceiver, for determining whether the existing rocker switch was successfully toggled in response to operating the motor, and for causing the transceiver to transmit a signal indicative of whether the existing rocker switch was successfully toggled.

14. The remote-controlled switch cover assembly of claim 13, further comprising:

means for determining whether or not current is flowing through the existing rocker switch;

wherein the processing circuitry determines whether the existing rocker switch was successfully toggled by determining when current is flowing through the existing rocker switch via the means.

15. The remote-controlled switch cover assembly of claim 2, wherein the processing circuitry further determines when the existing rocker switch has been turned on and, in response, causing the motor to drive the gear train in a second, reverse rotational direction from the first rotational direction, causing the wiper to move to a position over a valley of the existing rocker switch.

16. The remote-controlled switch cover assembly of claim 15, further comprising: a switch coupled to the processing circuitry; and a switch state detection mechanism for actuating the switch when a physical state of the existing rocker switch has changed; wherein the processing circuitry determines when the existing rocker switch has been turned on when the processing circuitry detects a change of state of the switch.

17. The remote-controlled switch cover assembly of claim 15, wherein the processing circuitry further: determines when the wiper has moved to a position over the valley; and stops the motor from rotating when the processing circuitry has determined that the wiper is positioned over the valley.

18. A method performed by a remote-controlled switch cover assembly for remote control of an existing rocker switch, comprising:

receiving a wireless signal to actuate the existing rocker switch;

in response to receiving the wireless signal, activating a motor that causes a gear train to turn in a first direction, which in turn causes a wiper to rotate a tilt plate in a first rotational direction; and in response to the tilt plate rotating in the first rotational direction, causing the existing rocker switch to change state.

* * * * *